March 2, 1971
P. F. WARNER
3,567,608
MERCAPTAN SYNTHESIS USING ULTRAVIOLET RADIATION AND A PROMOTER
CONTAINING A PHOSPHITE AND AZOBISISOBUTYRONITRILE
Filed April 29, 1968
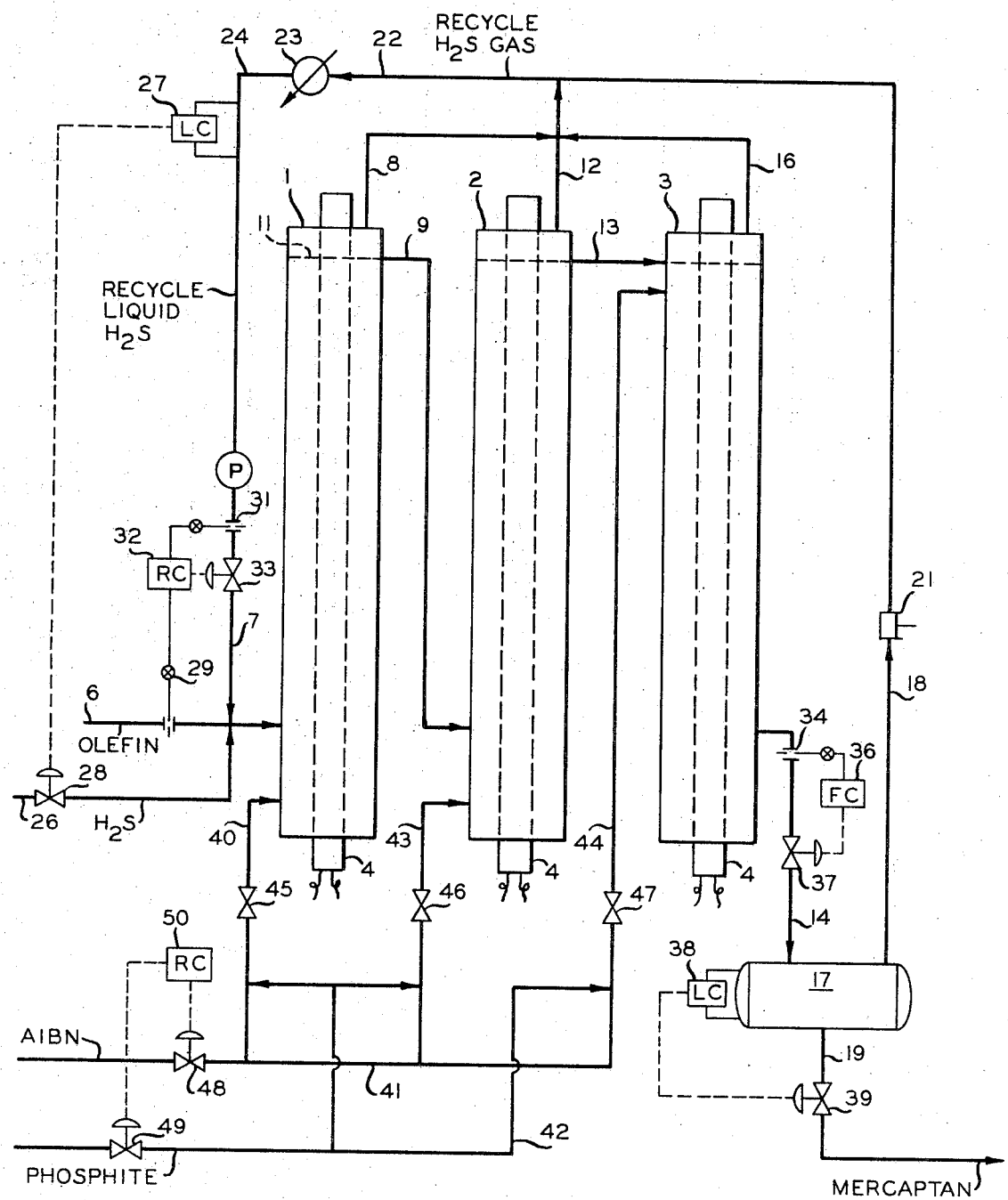
INVENTOR.
P. F. WARNER
BY
*Young & Quigg*
ATTORNEYS 3,567,608
MERCAPTAN SYNTHESIS USING ULTRAVIOLET RADIATION AND A PROMOTER CONTAINING A PHOSPHITE AND AZOBISISOBUTYRONITRILE
Paul F. Warner, Phillips, Tex., assignor to Phillips Petroleum Company
Filed Apr. 29, 1968, Ser. No. 725,097
Int. Cl. B01j 1/10; C07c 3/24
U.S. Cl. 204—162                9 Claims

ABSTRACT OF THE DISCLOSURE

The reaction rate and conversion of ethylenically unsaturated compounds and hydrogen sulfide carried out in the presence of ultraviolet radiation is improved by the utilization in the reaction system of a combination promoter consisting of a phosphite of the formula $(ArO)_3P$ and azobisisobutyronitrile.

BACKGROUND OF THE INVENTION

The preparation of mercaptans and thioethers (sulfides) by reacting hydrogen sulfied with organic compounds containing ethylenic linkages is well known in the art. When this reaction is carried out photochemically in the presence of ultraviolet radiation, the addition of the sulfhydryl group —SH, to the unsaturated compound occurs in an abnormal manner, i.e., contrary to the course suggested by the Markowinkoff rule, that is, the sulfhydryl group becomes affixed to the unsaturated carbon atom holding the most hydrogen atoms and the hydrogen atom becomes affixed to that unsaturated carbon atom carrying the lesser number of hydrogen atoms. This abnormal conversion reaction is well known in the art and it has been used to form mercaptans and thioethers (sulfides) such as those used in insecticide and repellent compositions, highway paint formulations, and paint formulations for china.

However, the conversion of the unsaturated compound by this reaction is often of a low order, and many unsaturated compounds, such as ethylene, are not readily converted while others require an induction period before any appreciable conversion results. Also the ultimate yield of mercaptans and/or thioethers when prepared according to this known photochemical process have not been as great as desired.

Thus the ultraviolet promoted synthesis of mercaptans and thioethers suffers from the disadvantage of being tedious due to the slowness of the reaction. In addition, for some reactants, such as ethylcyclohexene, the reaction stops, or comes to equilibrium with only about 30 percent of the ethylcyclohexene converted. Accordingly, it would be advantageous to the art to provide a process for the synthesis of mercaptans which not only has an increased reaction rate but which also produces an adequate conversion of the reactants.

This advantage is further desirable in light of the current interest in the use of mercaptans in combination with sulfide derivatives thereof in the formulation of highway paint. Obviously, in providing a feasible product the paint ingredients must be available in an amount and at a price to enable the preparation of an economically attractive product. One cost factor is the overall time required to produce the desired product. A reduction in time then represents a reduction in cost. It is thus highly advantageous to the industry to have a process wherein the useful end product can be produced in a minimum amount of time without the necessity of further processing.

Accordingly, an object of this invention is to provide a novel method for preparing organic sulfur compounds. Another object is to provide a novel method of preparing mercaptans and/or thioethers by reacting hydrogen sulfide with ethylenically unsaturated compounds in the presence of ultraviolet radiation and a novel reaction promoter. Another object is to increase the conversion of ethylenically unsaturated organic compounds in the reaction of same with hydrogen sulfide in the presence of ultraviolet radiation. A still further object of the invention is to increase the rate of reaction between such unsaturated compounds and hydrogen sulfide, and to increase the yield of mercaptans and/or thioethers produced thereby. Other aspects, objects, and the several advantages of this invention will be apparent from the following specification and claims.

THE INVENTION

In its broader aspects, my invention resides in the discovery that the photochemical reaction of ethylenically unsaturated compounds and hydrogen sulfide in the presence of ultraviolet radiation can be substantially promoted by carrying out the reaction in the presence of a mixture comprising an organic triaryl phosphite having the formula $(ArO)_3P$ and azobisisobutyronitrile (AIBN). By carrying out the reaction in the presence of my novel mixture of reaction promoters I have found that the conversion of the unsaturated compound is substantially increased, as well as the rate of reaction, and that increased yields of mercaptans and/or thioethers are obtained.

In one specific embodiment of this invention there is provided a process for the production of ethylcyclohexyl dimercaptan having a sufficient sulfide content therein to render it immediately useful for paint formulation.

A major constituent of sulfur based highway paint formulations is an ethylcyclohexyl dimercaptan mixture containing about 50 weight percent sulfides or "heavies" therein. These "heavies" are thiol-terminated polymers of the dimercaptan or thiol-terminated thioethers. Prior techniques for the preparation of this material required a two-step process wherein a total time of more than 50 hours was needed to obtain the mercaptan mixture having the requisite "heavies" content therein. Such techniques as heretofore practiced would render any commercial application thereof unattractive due to the expense and tediousness of the operation caused by the excessive time required for production of the desired product. By utilizing the single-step process of the present invention there is achieved the production of the desired ethylcyclohexyl dimercaptan "heavies" mixture in a reaction time of 20 hours or less. Total reaction time will, of course, be dependent upon the conditions employed for the reaction; but, in any event, by using the combination promoter of this invention there is achieved a significant reduction of the time as compared with any other process heretofore known to the art.

In another specific embodiment of this invention, there is provided an improved process for the synthesis of pinanyl mercaptan-2 from α-pinene and hydrogen sulfide. The pinanyl mercaptan-2 is useful in the formulation of china paint. By utilizing the process of the present invention, the reaction rate can be quadrupled as compared to the systems heretofore available for the preparation of such organo sulfur compounds.

The combination promoter mixture utilized in accordance with the present invention consists of a combination of an aryl phosphite of the formula $(ArO)_3P$ wherein Ar is an aryl or alkaryl having 6 to 10 carbon atoms. Examples of radicals of the type Ar are phenyl, tolyl, ethylphenyl, butylphenyl, 2,4-dimethylphenyl, and the like, and azobisisobutyronitrile (AIBN).

Representative phosphite reaction promotors which are useful in the practice of this invention include triphenyl phosphite, tritolyl phosphite, trixylyl phosphite, trinaphthyl phosphite, tributylphenyl phosphite, and the like.

Based upon the volume of ethylenic unsaturated compound in the reaction system, the promoter mixture can be utilized within the following ranges:

| Promoter | Broad | Preferred |
| --- | --- | --- |
| $(ArO)_3P$, vol. percent | 0.5–5 | 1–2 |
| AIBN, wt. percent | 0.1–5 | 1–2 |

The process of the present invention is carried out under the following range of conditions:

| | Broad | Preferred |
| --- | --- | --- |
| Temperature, °F | 40–200 | 80–120 |
| Pressure, p.s.i.g | 200–600 | 250–500 |
| Reaction time, hrs | 0.25–20 | 1–10 |
| $H_2S$/olefin ratio | 1–20 | 2–10 |

The reaction of this invention can be carried out in a batch, intermittent, or continuous manner. The accompanying drawing illustrates one aspect of the invention wherein the reaction is carried out in a continuous system. When utilizing a continuous system, the reaction is preferably carried out in a series of reactors with at least the reaction in the first reactor of the series being exposed to ultraviolet radiation. Gaseous hydrogen sulfide is removed from the top of each reactor. The residual amount of hydrogen sulfide left in the reaction effluent from the series of reactors can be removed by a simple flashing operation. The hydrogen sulfide after recompression can be recycled together with the hydrogen sulfide removed from the tops of each of the reactors to the first and/or one or more of the downstream reactors in the series. The liquid product obtained from the flashing operation can then be fractionated or otherwise separated to recover the sulfur compounds or if desired can be utilized as obtained without separation of the "heavies" or sulfide content.

Further understanding of this aspect of the invention may be gained by the following description of the accompanying drawing, which illustrates a continuous process for the production of the sulfur compounds according to this invention.

In the drawing, a plurality of reactors 1, 2 and 3 are illustrated, connected in series; liquid reactants are fed to the first reactor 1 and the liquid reaction mixture from each reactor passed to the next reactor in the series. Each of reactors 1, 2 and 3 are shown provided with a source 4 of ultraviolet radiation, for example a mercury arc lamp. Such source 4 is preferably disposed within each reactor, as shown, though the source may be disposed outside of the reactor and the reactor made transparent in whole or part to the ultraviolet radiation and material such as Pyrex, Vycor and quartz may be used for this purpose. Such sources of ultraviolet radiation are conventional and need not be described in detail. The number of reactors used can vary and will be at least two reactors in series, with at least the first reactor in the series being provided with an ultraviolet radiation source. Such reactors can comprise vertical cylindrical shells provided with suitable openings for the introduction and withdrawal of fluids.

Supply line 6 supplies the ethylenically unsaturated compound, which is liquid under the operating conditions of the process, to the first reactor 1 in the series, this feedstock preferably being introduced into the lower end of the reactor. Liquid hydrogen sulfide is supplied to the first reactor by a supply line 7, and it is preferably mixed with the feedstock in line 6. The mixture of promoters is supplied to reactor 1 by means of line 40 which is in communication with a metered source of each promoter via lines 41 and 42. The reactants introduced into the first reactor 1 react in an exothermic fashion. The heat of reaction (and/or heat supplied by supplemental heating means) cause the liquid hydrogen sulfide to vaporize to a great extent, causing agitation or boiling of the reaction mixture. The bulk or major part, i.e., at least 50 percent, of the reaction takes place in the first reactor. Vaporized hydrogen sulfide is withdrawn from the top of reactor 1 by overhead line 8 and liquid reaction mixture is withdrawn from reactor 1 by line 9, which is preferably disposed near the top of the reactor at the locus of liquid level 11. The withdrawn liquid reaction mixture in line 9, comprising unreacted reactants and product, is then introduced into the second reactor 2 in the series, again preferably near the lower end of the reactor. Additional quantity of the mixture of promoters is supplied to the reactor 2 by means of line 43 which is in communication with lines 41 and 42. In the second reactor 2, further reaction takes place at a higher temperature level (which can be maintained by suitable heating means), the liquid hydrogen sulfide again causing agitation within the reactor and the evolved hydrogen sulfide gas being withdrawn via overhead line 12. The liquid reaction mixture from the second reactor 2 is then passed to the third reactor 3, and since the latter is the last reactor, the reactor mixture is preferably introduced into the upper end thereof via line 13 since the reaction effluent from this last reactor is withdrawn via line 14 from the lower end thereof. If desired, a further portion of the promoter mixture is supplied to reactor 3 by means of line 44. The relative proportion of total promoter mixture to the reactors can be regulated by valves 45, 46 and 47. The ratio of each promoter component is regulated by means of valves 48 and 49 operated in response to ratio controller 50. Further reaction takes place in this last reactor 3 at a high temperature level such that substantially all of the unreacted hydrogen sulfide left in the reaction mixture is vaporized and withdrawn overhead via line 16. The liquid reaction effluent in line 14 can then be passed to suitable recovery equipment for the separation of hydrogen sulfide and unreacted ethylenically unsaturated compounds from the product. For example, the reaction effluent 14 is passed to a flash drum 17, operated at lower pressures, so as to flash off from the reaction effluent a small residual amount of hydrogen sulfide, the latter being withdrawn from the flask tank via line 18. The liquid portion of the reaction effluent is then withdrawn via line 19 and passed to suitable separation equipment, such as a distillation column, for the separation of the organic sulfur product and unreacted ethylenically unsaturated compound.

The vaporized hydrogen sulfide, withdrawn from the tops of the reactors, can be combined, along with the flashed hydrogen sulfide from line 18 (after it is compressed by compressor 21) and passed via line 22 to suitable liquification means, such as a cooler 23. The reliquified hydrogen sulfide is then recycled via lines 24 and 7 to the first reactor in the series of reactors, as shown. Make-up liquid hydrogen sulfide can be added via line 26 to the feedstock in line 6. Alternatively, make-up liquid hydrogen sulfide and/or recycle liquid hydrogen sulfide can be added to one or more of the downstream reactors.

The process illustrated in the drawing can be provided with suitable control instrumentation to insure a proper mole ratio of hydrogen sulfide to ethylenically unsaturated compound. For example, where the recycle liquid hydrogen sulfide source is elevated as shown, line 24 can be provided with a liquid level controller 27 to manipulate flow control valve 28 in make-up hydrogen sulfide supply line 26. The flow rates in the feedstock line 6 and recycle hydrogen sulfide line 7 can be detected by conventional flow detecting devices 29, 31, respectively, and the ratio of these flows measured by a flow rate ratio controller 32, which manipulates flow control valve 33 in recycle line 7 when the measured ratio varies from the desired valve supplied by the setpoint of ratio controller 32.

The flow rate of the reaction effluent withdrawn from the last reactor 3 via line 14 can be controlled in a conventional manner by a control assembly comprising flow measurement device 34, flow rate controller 36 and flow control valve 37. Withdrawal of liquid product from flash unit 17 can be controlled conventionally by liquid level controller 38 and flow control valve 39.

The ethylenically unsaturated compounds which may be reacted with hydrogen sulfide according to this invention include those with one or more ethylenic linkages, although those generally applicable will have a total of from 2 to 20 carbon atoms per molecule and 1 to 3 ethylenic linkages. Such unsaturated compounds include acyclic and cyclic olefins, and the like. Representative unsaturated compounds useful in the practice of this invention include ethylene, propylene, butene-1, butene-2, isobutene, pentene-1, pentene-2, hexene-1, heptene-1, octene-1, decene-1, dodecene-1, pentadecene-1, heptadecene-1, eicosene-1, isopentene-1, 4-methyl-1-pentene, 3,6-dimethyl-1-heptene, 7-methyl-4-nonene, 4-methyl-5-butyl-4-decene, 1,4-diphenyl-2-butene, 3-cyclohexyl-6-eicosene, 4,4 - dimethyl-1-pentene, 4-methyl-2-pentene, 2,4,4-trimethyl-2-pentene, cyclopentene, 3-ethylcyclopentene, 2,5-diethylcyclopentene, cyclohexene, 3-ethylcyclohexene, 2-ethyl-4-methyl-5-heptyl-6-butylcyclohexene, cycloheptene, cyclooctene, 4-vinylcyclohexene, 3-ethyl-5-vinylcyclohexene, 4-(1-cyclohexenyl)butene-1, 4-vinylcyclopentene, 1-methyl-2-dodecyl-4-vinylcyclopentene, and the like.

A particularly useful class of ethylenically unsaturated compounds which can be employed in the process of this invention is that of doubly unsaturated terpene compounds, which can be reacted with hydrogen sulfide to produce cyclic dimercaptans. These doubly unsaturated cyclic terpene reactants will generally have at least 10 carbon atoms per molecule and include both cyclic and unsymmetrical bicyclic terpenes or mixtures thereof. Representative examples of suitable cyclic terpene compounds that can be employed according to the invention include dipentene (di-limonene or 1,$\Delta^{8-9}$-menthadiene), alpha-terpinene, gamma-terpinene, alpha phellandrene, beta-phellandrene, terpinolene, 3,$\Delta^{8-9}$-methadiene, sylvestrene (derivative of methmenthane), cadinene (bicyclic sesquiterpene), alpha-selinene (bicyclic sesquiterpene), $\Delta^{1-7}$-3-methadiene beta-terpinene),$\Delta^{1-7}$,$\Delta^{8-9}$-menthadiene, and the like.

It is also within the scope of this invention to employ suitable diluents or solvents which are inert with respect to the reactants and conditions of reaction. For example, the ethylenically unsaturated compound can be dissolved in benzene, toluene, butanol, gasoline, etc.

Typical and representative of the various mercaptans and/or thioethers which can be produced according to this invention include ethyl mercaptan, propyl mercaptan, cyclohexyl mercaptan, ethyl cyclohexyl dimercaptan, diethyl thioether, dipropyl thioether, dicyclohexyl thioether, butyl mercaptan, dibutyl thioether, dodecyl mercaptan, dipentadecyl sulfide, eicosyl mercaptan, 4-methyl-n-pentyl mercaptan, cyclooctyl mercaptan, 3-chloropropyl mercaptan, 2-bromethyl mercaptan, 2-mercaptobutane-1,4-diol, 3-mercaptopropionic acid, thioglycollic acid, ethyl 3-mercaptopropionate, 2-mercaptobutane-1,4-dioic acid, bis(2-mercaptoethyl)ether, 2-mercaptoethyl benzyl ether, pinanyl mercaptan-2, and the like.

Although the reaction described herein can be carried out by using the whole range of ultraviolet radiations, i.e., wavelengths in the range of 100 to 3800 angstrom units, ultraviolet radiations having wavelengths below about 2900 angstrom units are preferred. The amount of radiation can vary over a wide range and will be dependent upon many factors, such as the particular unsaturated compound used as a reactant and the amount thereof, the source of radiation, and other considerations.

Generally, however, the rate of ultraviolet radiation, expressed in terms of REP (roentgen equivalent physical) per hour will be in the range between $1 \times 10^3$ to $1 \times 10^{10}$, and the total radiation or dosage will generally be in the range between $1 \times 10^5$ and $1 \times 10^{11}$ REP.

The following examples further illustrate the objects and advantages of this invention, but it should be understood that the various reactants, amounts, temperatures, pressures, and other conditions recited in this example should not be construed so as to unduly limit this invention.

Example I

A series of runs was carried out utilizing α-pinene. In making the runs, the desired amount of olefin and promoter was charged to the 6400 ml. thermal siphon type UV reactor and the reactor was then filled with pure grade $H_2S$ which has been previously distilled to remove dissolved free sulfur. The UV lamp (1200 watt) was turned on to start the reaction. Samples were withdrawn and analyzed for mercaptan sulfur at intervals to follow the course of the reaction.

Four runs were made at 6 to 1 mole ratio of $H_2S$ to olefin, with and without triphenyl phosphite and AIBN.

The following results were obtained:

| Run Number | 1 | 2 | 3 | 4 |
| --- | --- | --- | --- | --- |
| Promoter and amount [1]: | | | | |
| Triphenyl phosphate, vol. percent | 0 | 2.5 | 0 | 2.0 |
| AIBN, wt. percent | 0 | 0 | 0.9 | 0.5 |
| Mercaptan sulfur, wt. percent: | | | | |
| Reaction time, hrs.: | | | | |
| 0.25 | | | 1.91 | 1.92 |
| 0.5 | 1.48 | 2.21 | 3.33 | 4.42 |
| 1.0 | 2.65 | 3.24 | 4.40 | 5.38 |
| 2.0 | 3.71 | 4.55 | 4.91 | 6.22 |
| 4.0 | | | 6.27 | 6.61 |
| 5.0 | 5.22 | 5.84 | 6.03 | |
| 6.0 | | | 6.02 | |
| 8.0 | 5.76 | 6.24 | | |
| 11.0 | | 6.51 | | |
| 12.0 | 6.28 | | | |
| 13.0 | | 6.65 | | |
| 15.0 | 6.59 | | | |

[1] Based on olefin.

The products made with AIBN and triphenyl phosphite as promoters were composited and distilled in a 1¼-in. I.D. by 1-ft. long column packed with protruded packing. Properties of the mercaptan composite are shown in Table I. Material balance data for one of the runs made at 6/1 mole ratio $H_2S$ to olefin with AIBN as promoter are shown in the following tabulation:

| | Ml. | G. | Moles | Mole percent |
| --- | --- | --- | --- | --- |
| A. Charge: | | | | |
| α-pinene | 2,500 | 2,165 | 16 | 100 |
| $H_2S$ | 3,900 | 3,080 | 91 | |
| AIBN | | 13 | | |
| B. Crude mercaptan (mercaptan sulfur 7.40 wt. percent) | | 2,460 | | |
| C. Products recovered by distillation: | | | | |
| Recycle olefin | 1,715 | 1,460 | 10.8 | 67.4 |
| Pinanyl mercaptan-2 [1] | 735 | 695 | 4.1 | 25.7 |
| Heavies [2] | 228 | 220 | 1.1 | 6.9 |
| D. Yield, mole percent based on olefin charged | | | | 25.7 |
| E. Yield, mole percent based on olefin consumed | | | | 79.0 |

[1] Mercaptan purity of the composite was 97.4 wt. percent.
[2] Calculated as sulfide.

In the runs made at 6 to 1 mole ratio $H_2S$ to olefin, it may be seen that the reaction rate was 2 to 4 times as fast for the run with both triphenyl phosphite and AIBN as for the run with no promoter. The data also show that AIBN at 0.9 wt. percent concentration was about one and one half times as effective as triphenyl phosphite at 2.5 volume percent concentration.

TABLE I.—PROPERTIES AND COMPOSITION OF PINANYL MERCAPTAN-2 MADE FROM α-PINENE AND H₂S BY THE UV PROCESS WITH TRIPHENYL PHOSPHITE AND AZOBISISOBUTYRONITRILE AS PROMOTERS

Refractive index 20/D—1.5072
Specific gravity 20/4 C—0.9733
Mole weight—169.1
Total sulfur, wt. percent—18.7
Mercaptan sulfur, wt. percent—18.44
Mercaptan purity [1], wt. percent—97.7.

| Distillation: | F at 5 mm. Hg | F at 760 |
|---|---|---|
| IBP | 140 | 381 |
| 5 | 169 | 419 |
| 10 | 172 | 422 |
| 20 | 175 | 426 |
| 30 | 176 | 428 |
| 40 | 176 | 428 |
| 50 | 177 | 429 |
| 60 | 178 | 430 |
| 70 | 178 | 430 |
| 80 | 180 | 433 |
| 90 | 182 | 435 |
| 95 | 186 | 440 |

Composition by chromatograph, wt. percent:
α-pinene—1.46
Unidentified—3.38
Pinanyl Mercaptan-2—60.81
Pinanyl Mercaptan-3—34.35
Heavies—Trace
Total—100.00

[1] Calculated from mole weight and mercaptan sulfur.

Example II

A series of runs was made using a 4:1 mole ratio of hydrogen sulfide to α-pinene with and without triphenyl phosphite and AIBN. In each run there was charged to a 6400 ml. thermal siphon type UV reactor a total of 3150 ml. (2720 g.) α-pinene and 3250 ml. (2570 g.) hydrogen sulfide. Samples were withdrawn at intervals and analyzed for mercaptan sulfur.

Runs 1 and 2 were made at a 4 to 1 mole ratio of H₂S to olefin, both with AIBN and with and without triphenyl phosphite.

Run 3 was made at a 4 to 1 mole ratio of H₂S to olefin utilizing as initial promoter a mixture of 2 volume percent triphenyl phosphite and 0.25 wt. percent AIBN. After 4.75 hours of reaction an additional 0.5 wt. percent of AIBN was added to the system.

The following results were obtained:

| Run Number | 1 | 2 | 3 |
|---|---|---|---|
| Promoter [1]: | | | |
| Triphenyl phosphite, vol. percent | 1.75 | 0 | 2.0 |
| AIBN, wt. percent | 0.5 | 0.5 | 0.75 |
| Mercaptan sulfur at indicated reaction time, wt. percent | | | |
| Reaction time, hrs.: | | | |
| 0.25 | 1.21 | 0.66 | 0.70 |
| 0.5 | 2.28 | 0.84 | 0.82 |
| 1 | 4.00 | 1.26 | 1.47 |
| 2 | 5.44 | 1.83 | 3.24 |
| 3 | 6.01 | | 3.91 |
| 4 | 6.07 | 2.58 | 4.41 |
| 6 | | 3.02 | 5.73 |
| 8 | | 3.33 | 6.25 |

[1] Amount based on olefin.

The above data further show the reaction rate of the UV promoted reaction between hydrogen sulfide and α-pinene is about quadrupled by using as promoter the combination of triphenyl phosphite and AIBN.

Example III

Two runs were made at mole ratios of H₂S to vinylcyclohexene of 2. The liquid reactants were charged to a 6400 ml. thermal siphon type UV reactor equipped with a 1200 watt UV light (Hanovia). The vinylcyclohexene was pure grade having a peroxide number of 12.2. The hydrogen sulfide was distilled prior to use to remove dissolved free sulfur.

In carrying out these runs, the diolefin, triphenyl phosphite and hydrogen sulfide were charged to the reactor and irradiated with UV light for periods of 6 to 8 hours. In Run 1 only 2 volume percent triphenyl phosphite (TPP), based on olefin, was utilized as the promoter. In Run 2 a mixture containing 2 volume percent triphenyl phosphite and 0.4 weight percent azobisisobutyronitrile (AIBN) was utilized as promoter.

Samples were withdrawn at intervals during the run and analyzed for mercaptan sulfur, heavies content and composition. The heavies content was determined by flash distilling a sample at 300° F. and 0.5 to 1.0 mm. Hg absolute pressure using a rotary evaporator and an oil bath. The light ends from the flash distillations were analyzed by chromatograph and from these the compositions of the reactor products were calculated.

The following results were obtained:

| | Run Number | | | | | | | | | | |
|---|---|---|---|---|---|---|---|---|---|---|---|
| | 1 [1] | | | | | | 2 [2] | | | | |
| Reaction time, hours | 0.5 | 1.0 | 2.0 | 4.0 | 6.0 | 8.0 | 0.5 | 1.0 | 2.0 | 4.0 | 6.0 |
| Composition, wt. percent: | | | | | | | | | | | |
| Vinylcyclohexene | 2.9 | 1.5 | 0.8 | 0.3 | 0.2 | 0.4 | 3.7 | 0.7 | 1.0 | 0.5 | 0.3 |
| Monothiols A and B | 13.5 | 5.0 | 3.5 | 2.5 | 2.0 | 1.7 | 7.8 | 2.8 | 1.7 | 1.6 | 1.3 |
| Monothiols B and C | 20.3 | 15.6 | 12.2 | 9.6 | 8.6 | 7.8 | 2.0 | 10.9 | 7.6 | 8.0 | 6.9 |
| Dithiols | 19.6 | 31.3 | 34.0 | 33.6 | 34.9 | 34.9 | 28.5 | 35.1 | 35.6 | 34.0 | 34.9 |
| Heavies | 43.4 | 46.3 | 49.1 | 53.8 | 54.2 | 55.1 | 40.0 | 50.4 | 53.8 | 55.6 | 56.3 |
| Ether | 0.3 | 0.3 | 0.4 | 0.2 | 0.1 | 0.1 | | 0.1 | 0.3 | 0.3 | 0.3 |
| Total | 100.0 | 100.0 | 100.0 | 100.0 | 100.0 | 100.0 | 100.0 | 100.0 | 100.0 | 100.0 | 100.0 |
| Properties of heavy fraction: | | | | | | | | | | | |
| Mole weight | | 377 | | 388 | 392 | 395 | 360 | 388 | 401 | 399 | 386 |
| Mercaptan sulfur, weight percent | 14.05 | 14.13 | 14.43 | 15.46 | 14.65 | 14.99 | 13.18 | 14.37 | 14.69 | 14.55 | 13.47 |
| Thiol functionality | | 1.7 | | 1.9 | 1.8 | 1.9 | 1.5 | 1.7 | 1.8 | 1.8 | 1.6 |

[1] Promoter=TPP.
[2] Promoter=TPP plus AIBN.

The above data show that a product having at least 50 weight percent heavies can be made in a single step operation. Use of azobisisobutyronitrile (AIBN) as a promoter in combination with triphenyl phosphite resulted in an increase in the heavies formation rate to about double that obtained with the triphenyl phosphite alone. The desired 50 weight percent heavies was obtained in one hour irradiation with the promoter mixture as compared to over two hours utilizing only the triphenyl phosphite.

Example IV

In a system as shown in the accompanying drawing, a feedstock comprising vinylcyclohexene (VCH) is fed at a rate of 6500 g./hr. to reactor 1 through line 6. The vinylcyclohexene is mixed with liquid hydrogen sulfide at a feed rate of 3900 g./hr. of hydrogen sulfide as supplied by means of lines 26 and 7. The reaction mixture as introduced to reactor 1 has a mole ratio of hydrogen sulfide to VCH of 2:1. A promoter mixture of triphenyl phosphite and α, α′-azodiisobutyronitrile (AIBN) is simultaneously introduced to the reaction mixture in reactor 1 by means of line 40. The total reaction mixture is subjected to ultraviolet radiation in reactor 1, the reaction being carried out at 100° F. and a pressure of 350 p.s.i.g. Hydrogen sulfide gas is removed from the reactor by means of line 8. The rate of withdrawal from reactor 1 is such that the reaction mixture has a residence time of 0.5 hr. The reaction mixture withdrawn from reactor 1 via line 9 is further reacted in reactor 2 in the presence of ultraviolet radiation at a temperature of 150° F. Again evolved hydrogen sulfide is withdrawn via line 12 and the remaining reaction mixture after a residence time in the reactor 2 of 0.5 hr. is passed via line 13 to reactor 3 to further carry out the reaction. The reaction in reactor 3 is maintained at 200° F. and the bulk of the hydrogen sulfide remaining in the reaction mixture is withdrawn overhead via line 16. Liquid reaction effluent is withdrawn from the bottom of reactor 3 at a rate to give a residence time in reactor 3 of 0.5 hr. and passed via line 14 to flash drum 17 operated at atmospheric pressure. The residual amount of hydrogen sulfide is thus separated and passed by line 18, recompressed by compressor 21 and recycled to the process along with the evolved hydrogen sulfide gases withdrawn from the tops of the reactors.

Analysis of the liquid reaction effluent obtained at a rate of 10,000 g./hr. via line 19 showed it to have a "heavies" content of 56 weight percent.

Example V

A second run was carried out utilizing a feedstock of vinylcyclohexene and hydrogen sulfide in the system and under the conditions as described in Example IV. However, the promoter mixture of AIBN and triphenyl phosphite was introduced only to reactors 2 ind 3 thus permitting initial reaction of the VCH and hydrogen sulfide in reactor 1 to occur only in the presence of ultraviolet light from lamp 4. Reactor 1 was maintained at 100° F. and a pressure of 350 p.s.i.g. The promoter was added to reactors 2 and 3 by means of conduits 43 and 44 at a rate of 38 ml./hr. of triphenyl phosphite and 50 ml./hr. of AIBN. Residence time in each of the reactors was 0.5 hr. The resulting reaction product was recovered via line 19 at a product rate of 10,000 grams/hr.

The results of this run show that adequate reaction is achieved by addition of the promoters downstream of reactor 1 after initial reaction therein. In addition, heat control is minimized and $H_2S$ flashing is avoided. Thus control of the reaction isotherm is achieved while at the same time requiring no extension of total reaction time or conversion required to obtain the desired end products.

The above examples clearly demonstrate that utilization of the combination promoter formed by the admixing of AIBN and a compound of the formula $(ArO)_3P$ permits the obtaining of a significant increase in conversion and reaction rate.

Various modifications and alterations of this invention will become apparent to those skilled in the art from the foregoing discussion and accompanying drawing, and it should be understood that this invention is not to be limited to that set forth herein for illustrative purposes.

I claim:

1. In a process for producing an organic sulfur compound which comprises reacting an ethylenically unsaturated compound and hydrogen sulfide in a reaction zone wherein the reaction mixture is subjected to ultraviolet radiation, the improvement which comprises having additionally present in the reaction zone a reaction promoting amount of a mixture of a phosphite of the formula $(ArO)_3P$ wherein Ar is selected from the group consisting of aryl and alkaryl radicals having from 6 to 10 carbon atoms therein and azobisisobutyronitrile.

2. A process according to claim 1 wherein the reaction is carried out in a plurality of reaction zones in series 3. A process according to claim 2 wherein the promoting mixture of phosphite and azobisisobutyronitrile is introduced to one or more of said plurality of reaction zones in series downstream of the first reaction zone of the series.

4. A process according to claim 1 wherein said ethylenically unsaturated compound is vinylcyclohexene.

5. A process according to claim 1 wherein said ethylenically unsaturated compound is α-pinene.

6. A process according to claim 4 wherein the resulting reaction product is a mixture of vinylcyclohexane dimercaptan having a heavies content therein in the range of 50 to 60 weight percent.

7. A process according to claim 4 wherein said triaryl phosphite is triphenyl phosphite.

8. A process according to claim 5 wherein said triaryl phosphite is triphenyl phosphite.

9. A process according to claim 1 wherein said triaryl phosphite is utilized in an amount in the range of 0.5 to 5 volume percent and said azobisisobutyronitrile is present in an amount in the range of 0.1 to 5 weight percent.

References Cited

UNITED STATES PATENTS

| 3,143,487 | 8/1964 | Warner | 204—162X |
| 3,146,271 | 8/1964 | Louthan | 204—162X |
| 3,223,738 | 12/1965 | Crain et al. | 204—162 |
| 3,248,315 | 4/1966 | Warner et al. | 204—162 |
| 3,257,302 | 6/1966 | Warner | 204—162 |

BENJAMIN R. PADGETT, Primary Examiner

U.S. Cl. X.R.

204—158